March 16, 1926. 1,577,282
W. H. McCARTNEY
AGRICULTURAL IMPLEMENT
Filed June 6, 1924 2 Sheets-Sheet 1
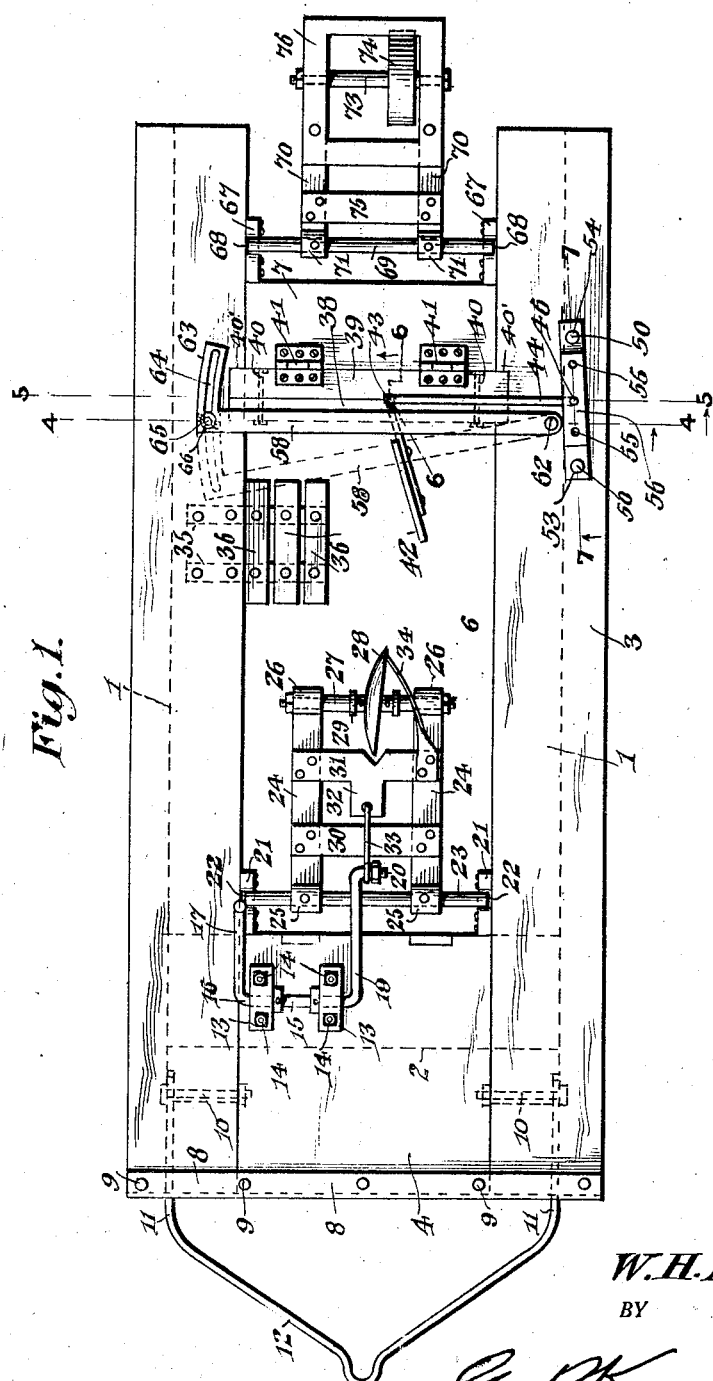
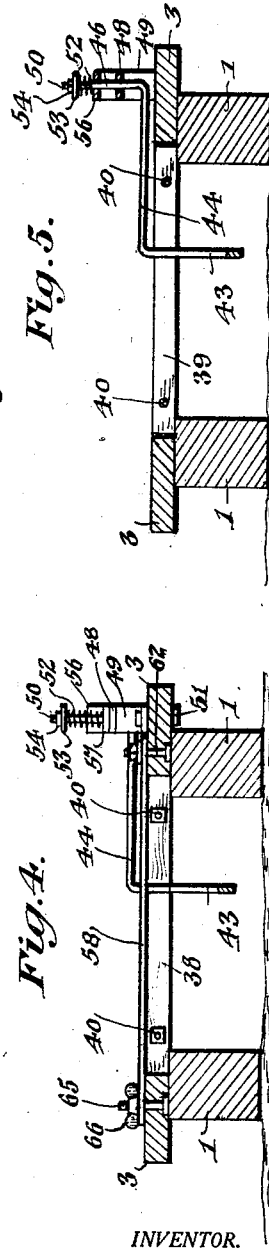
INVENTOR.
W. H. McCartney,
BY
Geo. P. Kimmel, ATTORNEY.

March 16, 1926. 1,577,282
W. H. McCARTNEY
AGRICULTURAL IMPLEMENT
Filed June 6, 1924  2 Sheets-Sheet 2
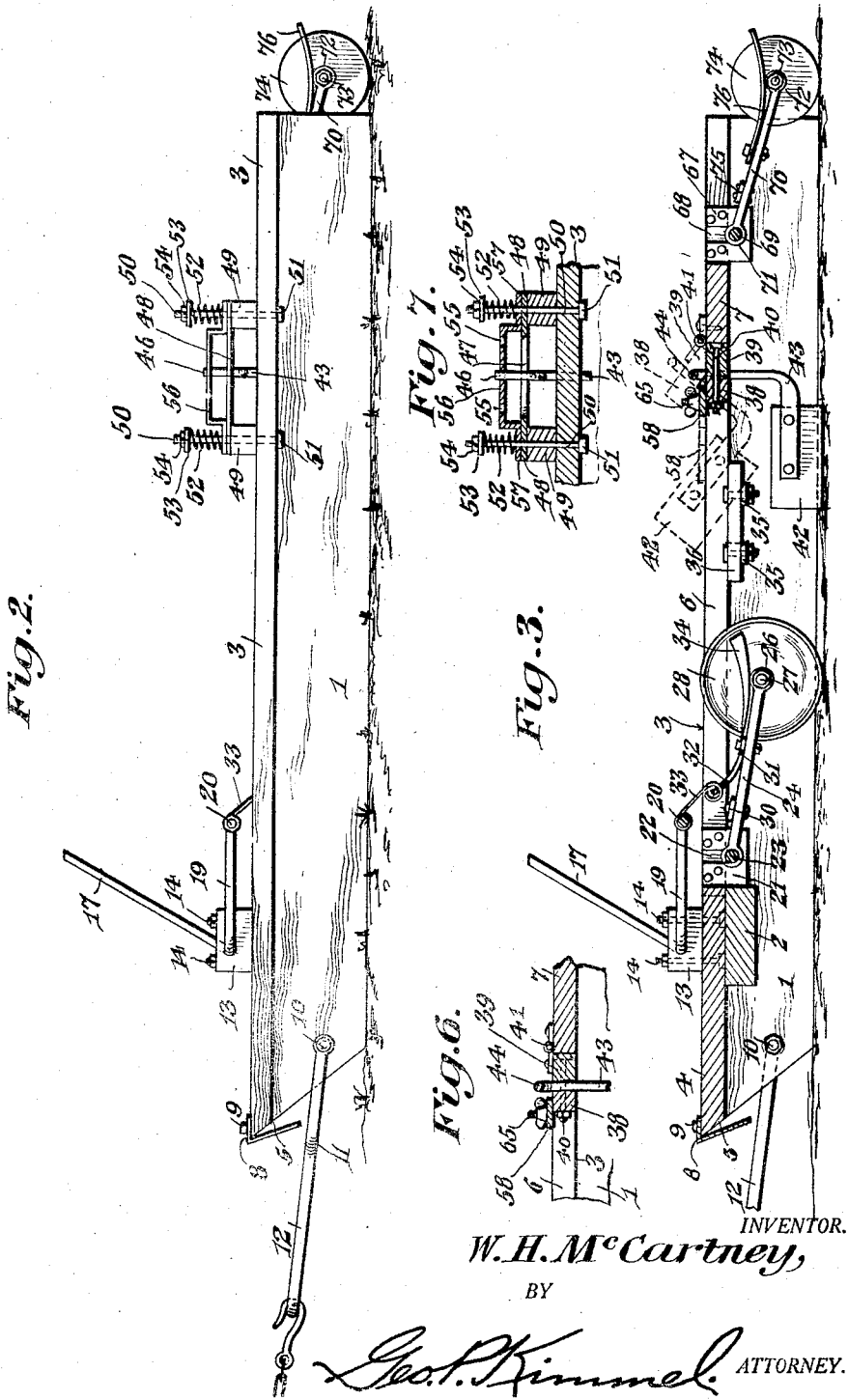
INVENTOR.
W. H. McCartney,
BY
Geo. P. Kimmel ATTORNEY.

Patented Mar. 16, 1926.

1,577,282

UNITED STATES PATENT OFFICE.

WILLIAM H. McCARTNEY, OF SALEM, OREGON.

AGRICULTURAL IMPLEMENT.

Application filed June 6, 1924. Serial No. 718,298.

*To all whom it may concern:*

Be it known that I, WILLIAM H. MCCART-NEY, a citizen of the United States, residing at Salem, in the county of Marion and State of Oregon, have invented certain new and useful Improvements in Agricultural Implements, of which the following is a specification.

This invention relates to apparatus designed to expedite the placing of young plants, such as tomato and strawberry plants.

The primary object of this invention is the provision, in a manner as hereinafter set forth, of an agricultural implement for use in setting plants having means for opening a furrow to receive the plant, means for covering the plant after the same has been set in the furrow by an attendant riding on the implement, and means for treading down the earth about the plant after the same has been covered by the covering means.

The invention contemplates the provision of a device in the form of a sled having a deck thereon provided with a centrally longitudinally extending well through which well there is suspended at the forward part of the sled a lister wheel for opening a furrow in the ground as the sled is drawn thereover. Means is provided in the well for supporting the plants to be set in the furrow by an attendant riding upon the deck of the mechanism, and after the plant has been set by the attendant, a scraper blade acts to replace the dirt in the furrow and about the plant and following this scraper blade is a means for packing the dirt firmly about the plant so that the same cannot become displaced or washed from the ground.

The mechanism for opening the earth, covering the plant and packing the earth thereabout is so constructed that any or all of the separate units may be raised from the ground when the device is traveling over ground in which plants are not to be placed.

A further and final object of the invention is the provision, in a manner as hereinafter set forth, of an agricultural implement for use in setting plants, which will be strong and sturdy in construction, of neat and compact arrangement, very efficient for the purpose intended and inexpensive to construct.

The invention will be best understood from a consideration of the following detailed description taken in connection with the accompanying drawings forming part of this specification, with the understanding, that the invention is not confined to any strict conformity with the showing of the drawings but may be changed and modified so long as such changes and modifications mark no material departure from the salient features of the invention as expressed in the appended claim.

In the drawings:

Figure 1 is a top plan view of the implement embodying this invention.

Figure 2 is a side elevation thereof.

Figure 3 is a central longitudinal sectional view of the implement.

Figure 4 is a transverse section taken upon the line 4—4 of Figure 1.

Figure 5 is a transverse sectional view taken upon the line 5—5 of Figure 1.

Figure 6 is a detail sectional view taken upon the line 6—6 of Figure 1.

Figure 7 is a detail sectional view taken upon the line 7—7 of Figure 1.

Referring now to the drawings in detail, wherein like numerals of reference indicate corresponding parts throughout the several views, the device embodying this invention comprises a pair of substantially elongated heavy parallel runner members or skids 1 connected across the front end by the broad brace bar 2 which has its ends countersunk in the top edge of the runners 1 and the top thereof is flush with the top of the runners.

Each of the runner members 1 has extending longitudinally thereof a broad plank 3, the inner edge of this plank being flush with the inner side of the runner and projecting a substantial distance beyond the outer side thereof as is clearly shown in Figures 4 and 5 of the drawings. Extending between and connecting the planks 3 at the forward end of the implement and supported upon the brace bar 2 is a broad connecting plank 4, the front edge of which is flush with the front edge of the runners and cut back as indicated at 5 to slope with the sloping forward ends of the runners as shown in Figure 2.

These side planks 3 and the forward central connecting plank 4 constitute a platform or deck for the device, leaving a central opening or well 6 between the runners of the implement. Extending across the well 6 at a point inwardly of the rear ends of the runners and planks 3 is a connecting supporting member 7 of substantial width, this member 7 besides serving to connect the rear runners has an additional function which will be set forth in the body of the specification.

Applicant desires the structure, thus far set forth, constructed of some light material such as wood, particularly the runners 1, for in constructing the runners of wood, the same may be broad without adding materially to the weight of the device and in making the runners of wood they will not cut into and dig up the ground as would runners of steel or similar material.

Extending across the front of the deck of the sled is an angled buffer or guard plate 8, one portion thereof overlapping the front of the deck and secured thereto by bolts 9 or other appropriate securing means, and the other portion of the buffer depending before the front of the sled to protect the same from damage.

Secured against the outer face of each of the runners 1 by means of pivotal bolts 10 is one leg 11 of a draft yoke 12 to which any desired draft device, such as a tractor, may be hitched to drag the implement over the ground.

Positioned upon the central portion 4 of the deck is a pair of spaced bearing blocks 13, secured by bolts 14 which extend through the deck as clearly shown in Figure 3 of the drawings. These bearing blocks 13 support the yoke 15 of a substantially U-shaped member indicated as a whole by the numeral 16, the leg portions of which member 16 normally extend toward the rear of the device in a substantially horizontal position. One leg of the device is turned up to form an actuating handle 17 while the other leg 19 has the terminal portion thereof, which extends a slight distance beyond the handle 17, turned outwardly as at 20 to form the crank shown.

Secured to the inner face of each runner 1 and depending into the well 6 is a vertically slotted block 21, these blocks being directly behind the rear edge of the central portion for the deck as is clearly shown in Figure 1 and in alignment one with the other. Supported in the slots 22 of these blocks 21 is a shaft 23 which extends across the well 6 and slightly below the deck of the implement. This shaft 23 carries thereon a pair of rearwardly extending spaced arms 24 the ends of these arms being formed to provide bearings 25 and 26 respectively, the bearings 25 having the shaft 23 passed therethrough, while there is extended through and connecting the bearings 26 a shaft 27 carrying thereon a lister wheel 28. This wheel 28 is formed to provide a hub upon each side thereof as indicated at 29, this hub being provided with oil holes 30' for the lubrication of the same upon the shaft 27. Oil holes may also be provided in the bearings 25 to lubricate the same upon the shaft 23.

A brace bar 30 connects the arms 24 adjacent their rear ends, and extending across and connecting the arms 24 directly forwardly of the lister wheel 28 is a substantially T-shaped member 31 constituting a lift bar for the furrow opening mechanism which this structure constitutes.

Connected to the standard 32 of the T-shaped member 31 is a link bar 33 which connects the lift member to the crank 20 of the U-shaped member 16.

This mechanism which, as above stated constitutes the furrow opening mechanism of the device, may be lifted clear of the ground when desired, by drawing the handle 17 toward the front of the mechanism thus swinging upwardly the crank end 20 of the arm 19 and drawing upon the link 33 to raise the mechanism clear of the ground.

Carried upon one of the arms 24 is a scraper knife 34 which contacts with the edge of the disc 28 and acts to keep the same clean and clear of dirt and mud when the mechanism is in operation.

Extending from the inner face of one of the runners 1, in the well 6, and rearwardly of and to one side of the furrow opening mechanism is a plant supporting platform constituting a pair of arms 35 the outer ends of which are secured to the top of the runners beneath the deck and extend into the well as shown and have laid across their extended inner ends the spaced slats 36 which form the platform proper and upon which the plants to be set are placed.

Extending across the well 6 behind the plant supporting platform 36 are parallel beams 38 and 39, respectively, secured together by means of bolts 40 and of a length sufficient to allow their ends to extend beyond the inner edge of the side planks 3 of the deck where they removably fit in the recesses 40' therein, and flush with the top thereof. The rear of the beams 39 is hingedly connected to the cross member 7 by hinges 41 to allow the joined beams to be raised when desired. A scraper blade 42 is provided for scraping the earth back into the furrow to cover the plants after they have been placed therein, and this blade 42 is supported in the well 6 by the vertical shaft 43 engaged to oscillate between the beams 38 and 39 and extended thereabove, where it is bent at right angles to provide the horizontal shaft 44 which extends outwardly above the plank 3 of the deck as shown in Figures 1, 4 and 5. The outer end of the shaft 44 is bent at right angles to form the vertical terminal portion 46 positioned over the plank 3 of the deck of the sled.

The central portion of this vertical shaft 46 extends through an elongated slot 47 which extends longitudinally of a plate 48, the ends of which plate are supported upon blocks 49 which blocks are secured to the deck of the sled by means of the vertical bolts 50, the heads 51 of which are secured beneath the deck and the upper ends of the bolts extend a substantial distance above the plate 48 and carry about these extended upper ends spiral springs 52 which are secured in position about the bolts 50 by means of the washer 53 and the nut 54 which is threaded on the end of the bolt. The upper or terminal end of the shaft 46 is held in position in apertures 55 formed in a bridge 56, this bridge 56 extending across the slot 47 and having its downturned and outwardly extended ends 57 supported upon the plate 48 at its outer end and between the plate and the lower end of the spiral spring 42. The bolt 50 passes through the ends 57 of this bridge member as clearly shown in Figure 7 and the downward pressure of the springs 52 thereupon tends to hold the ends 57 securely in position upon the plate 48. When it is desired to change the angle of the scraper blade 42, the bridge 56 is grasped and raised against the tension of the springs 52 and the vertical shaft 46 is then moved forwardly or backwardly in the slot 47 to revolve the shaft 43 until the terminal end of the shaft 46 is positioned to extend through one of the apertures 55.

Extending across the wall 6 from one plank 3 to the other plank 3, is a locking beam 58 which extends longitudinally of and across the forward edge of the beam 38, the ends of the beam 58 resting upon the deck of the sled, and one end thereof is pivotally secured thereto by the bolt 62. The other end has formed integral therewith and extending from one side thereof the segment 63 which rests flat upon the plank 3 of the deck and is adapted to slide thereover. This segment 63 has a slot 64 throughout its length as shown in Figure 1 of the drawings.

Extending through the slot 64 of the segment is a bolt 65 which passes through and is secured to the plank 3 of the deck of the sled and the upper end of this bolt 65 which is threaded, has threaded thereon the wing nut 66 by means of which the segment 63 may be tightened in any desired position upon the deck of the sled. The purpose of this lock bar 58 is as follows:

When the sled is traveling over ground not being worked and in which plants are not being set, it is desirable that parts of the device be lifted from the ground such as the disk 28 and the scraper blade 42. Means has already been provided for the raising of the disk 28 as explained above. In order to raise the blade 42 clear of the ground, the wing nut 66 is loosened and the lock bar 58 is swung upon its pivot pin 62 until the segment 63 is moved as far forward as it will go, whereupon the bar 58 will become disengaged from the beam 38 and this beam and the beam 39 to which it is bolted will be swung upwardly upon its hinges 41 until the lower face of the beam 38 is in a plane higher than the top of the lock bar 58, whereupon the lock bar 58 is swung back beneath the beam 38 and secured in position. The beam 38 is then swung down until it rests upon the top of the lock bar 58, whereupon the blade 42 will be suspended in the air above the ground as shown in dotted lines in Figure 3 of the drawings.

Secured against the inner edge of each of the planks 3, adjacent the rear edge of the cross member 7 and depending into the well 6 is a vertically slotted block 67 similar to the blocks 21 carried in the same position and depending into the well at the forward part thereof. These blocks 67 receive in their slots 68 the ends of the cross shaft 69 as shown. This shaft 69 carries thereon a pair of spaced rearwardly extending arms 70 similar to the arms 24 at the forward part of the sled, and each of these arms 70 has its ends formed to provide bearings 71 and 72 as shown. The bearings 71 have extended therethrough the shaft 69 and the bearings 72 carry a shaft 73 upon which there is mounted to revolve a roller 74. This roller is so positioned upon the shaft 73 that when plants have been placed in the furrow made by the disc 28 and covered with earth by the blade 42, the roller 74 will pass over the loose earth to one side of the plant and firmly pack the earth down thereabout. A brace member 75 is secured to and extended across between the arms 70 as shown.

Secured to the arms 70 is a frame 76 through which the roller 74 extends and against which roller the rear cross member of the frame 76 bears. This frame is of some resilient material such as metal so that the same will be bent to maintain the cross bar of the frame in spring pressed engagement with the periphery of the wheel 74 to keep the same clean of mud and earth.

From the foregoing description it may be seen that a very novel and efficient implement is provided for the planting of strawberry, tomato and other small plants, the same being accomplished without the usual fatigue accompanying this work as the operators ride upon the deck of the sled and while one operator upon one side assorts the plants and places them upon the plant rack 36, the other operator upon the opposite side of the sled takes the plants and sets them in the furrow cut by the wheel 28 and no further attention is given to the plants, for the covering blade 42 will then act to shove the dirt into the furrow to cover the plants and the wheel 74, which trails at the rear of the sled, will act to firmly pack the loose earth down into the furrow about the plant. Thus the only work done by the operators is the lifting of the plants from the platform and placing them in position in the furrow, the implement completing the operation.

Having thus described my invention what I claim is:

In an agricultural implement, a row covering device of the character set forth, comprising an elongated beam mounted transversely of said implement, an oscillatory shaft carried in vertical position by said beam and having its lower end bent to extend forwardly and further having its upper end bent to provide a laterally extending arm having its terminal portions turned upwardly, a covering blade secured to said bent lower end, a retaining element about said upturned terminal portion allowing limited movement of the same to revolve said shaft, and means overlying said element for engaging the portion extending therethrough to hold the same in any one of a plurality of positions.

In testimony whereof, I affix my signature hereto.

WILLIAM H. McCARTNEY.